B. H. CAMDEN.
TANK GAGE.
APPLICATION FILED JULY 3, 1912.
1,074,692.
Patented Oct. 7, 1913.
3 SHEETS—SHEET 3.
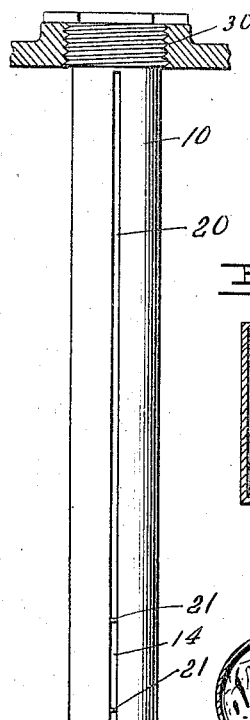
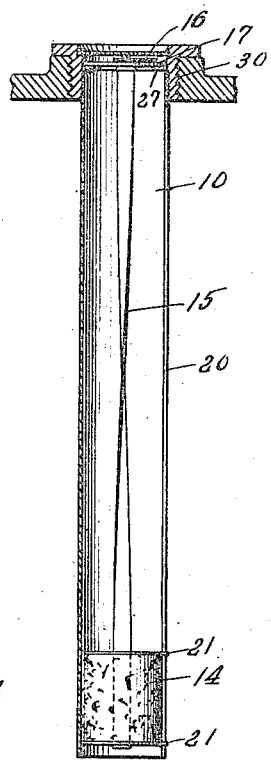
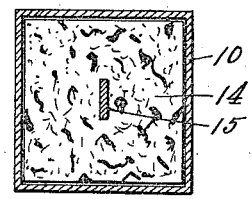
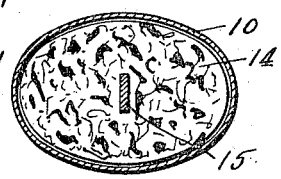
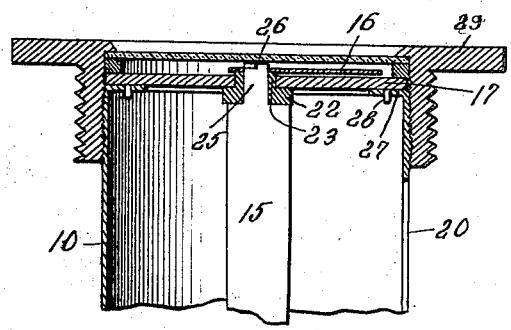
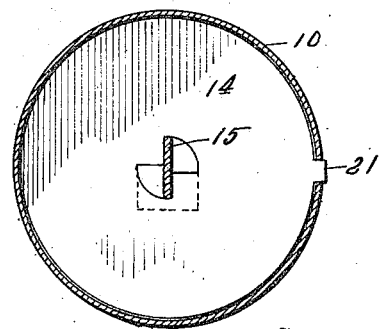
Inventor
Bernard H. Camden
Witnesses
By *Attorney*

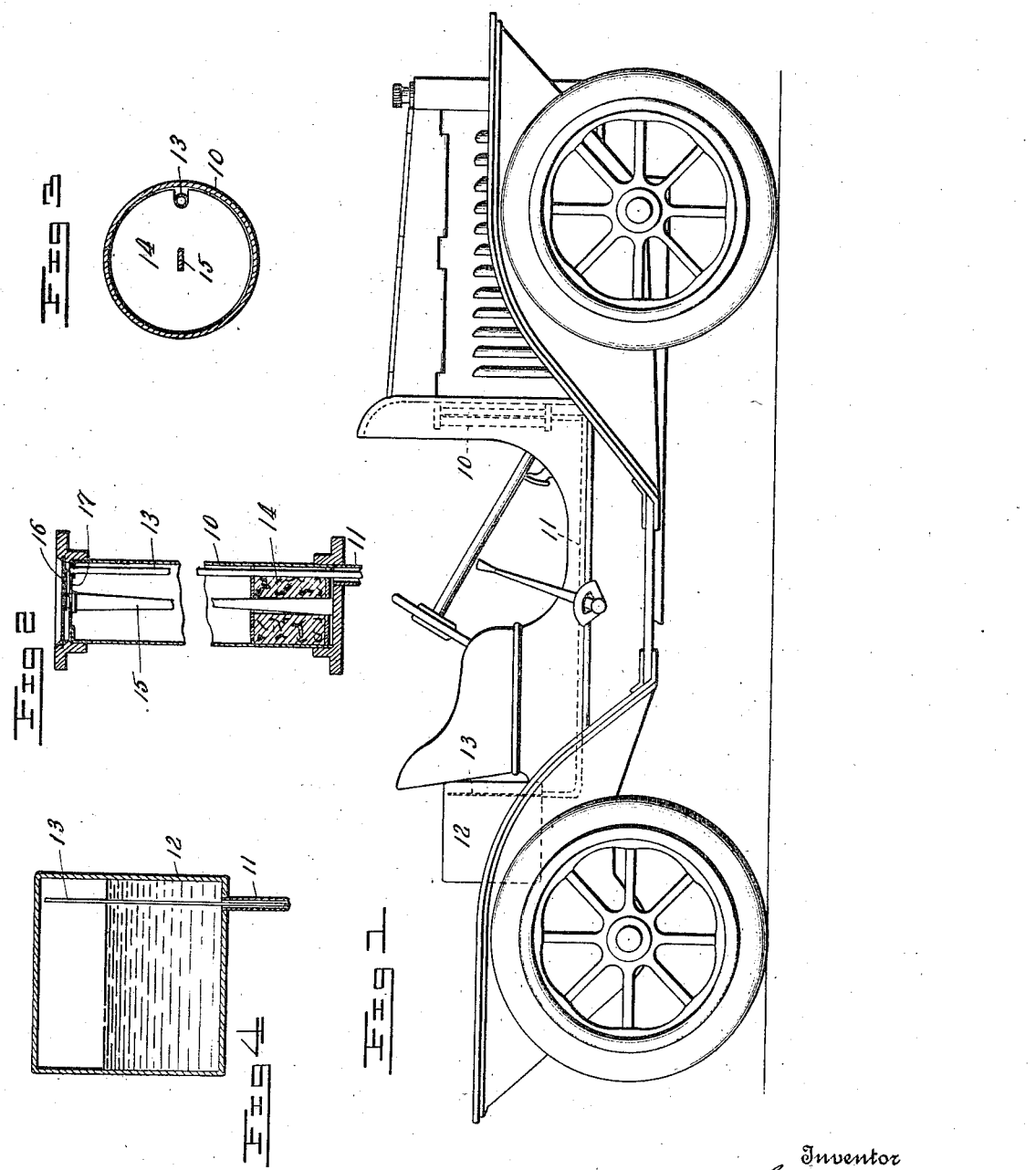

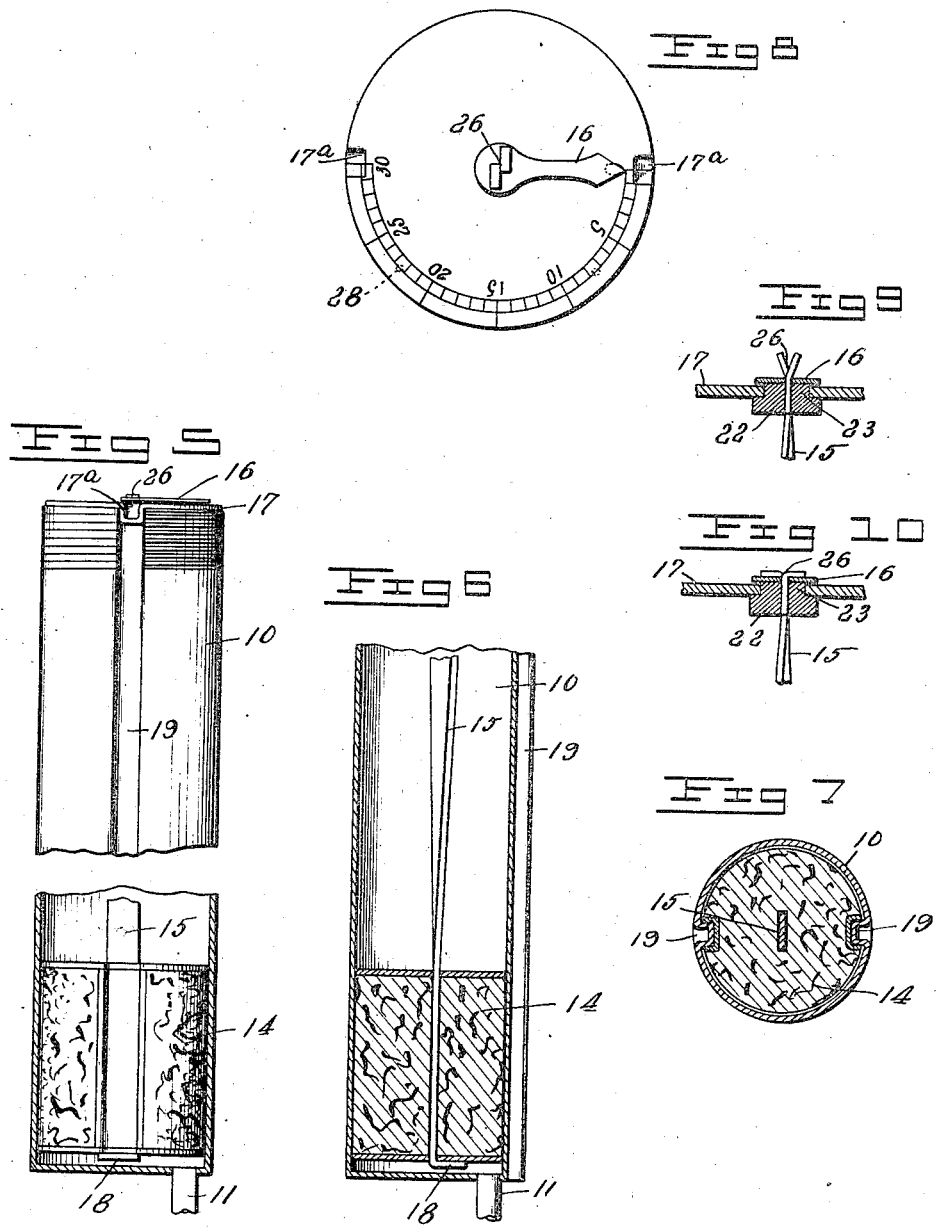

UNITED STATES PATENT OFFICE.

BERNARD H. CAMDEN, OF WASHINGTON, DISTRICT OF COLUMBIA.

TANK-GAGE.

74,692.   Specification of Letters Patent.   Patented Oct. 7, 1913.

Application filed July 3, 1912. Serial No. 707,543.

*To all whom it may concern:*

Be it known that I, BERNARD H. CAMDEN, a citizen of the United States, residing at Washington, in the District of Columbia, have invented new and useful Improvements in Tank-Gages, of which the following is a specification.

The present invention relates to float gages, and, while shown in connection with tank gages for automobiles, may, it will be understood, be utilized wherever a tank gage is necessary.

In order that the invention may be understood by those skilled in the art, I have illustrated in the accompanying drawings one embodiment thereof.

In the drawings:—Figure 1 is a conventional view in side elevation of an automobile showing the application of my invention thereto. Fig. 2 is a detail sectional view of the gage showing the interior arrangement. Fig. 3 is a cross sectional view, somewhat enlarged, of the gage shown in Fig. 2. Fig. 4 is a detail sectional view of the tank to illustrate the fluid and air connections with said tank. Fig. 5 is a view, partly in section of a slightly different form of gage. Fig. 6 is a sectional view of a portion of the gage shown in Fig. 5. Fig. 7 is a cross sectional view of the gage shown in Fig. 5. Fig. 8 is a plan view of the dial and index of the gage. Figs. 9 and 10 are detail views to show the construction and manner of assembling the dial and the graduating spiral for the index. Fig. 11 is a sectional view to illustrate the spiral bearing and the index-securing means for the gage. Figs. 12, 13 and 14 illustrate a gage, slightly different in construction, embodying features of my invention. Figs. 15 and 16 illustrate gages of different cross section made in accordance with my improvements.

Referring to the drawings by numerals, like numerals indicating like parts in the several views, 10 indicates the gage, which is connected by pipe 11 with the tank 12, said pipe 11 forming the fluid conduit between the gage and the tank. Within this fluid conduit 11 I preferably place the air pipe 13, one limb of which rises to the top of the tank 12 and the other limb of which rises to the top of the gage 10. By placing the air pipe 13 within the fluid conduit 11, I dispense with the necessity of tapping the gage and tank twice, it being necessary only to provide one coupling for the fluid conduit or pipe 11 with the air pipe 13 traversing this conduit.

The gage 10 comprises the barrel or body portion provided at its top with a glazed cap plate and having at its bottom a plate as shown, which, together with the barrel portion of the gage, form a tight receptacle. While I have shown a float barrel having a bottom plate, this being necessary where the gage is a dash gage, such bottom plate will, of course, be omitted where the gage is directly in the tank. Within this receptacle is mounted the float 14, provided centrally with an opening to engage the spiral ribbon 15, so that, as the float rises and falls with the varying heights of the liquid, it will drive the spiral 15. The float 14 is held against rotation by the air pipe 13 which extends into the gage, this air interchange pipe having the additional function of a guide for the float, said float 14, as best shown in Fig. 3, being slotted at one side to embrace the pipe 13 which will prevent rotation of the float and confine its movement to vertical rising and falling movements, this float being of buoyant material, such as wood, shellacked cork, or, if desired, a hollow buoyant body, so that it will float within the gage. Obviously, the rising and falling movements of the float 14 will effect a rotation of the spiral 15 which, in turn, will move the index finger 16 over the graduations of the gage plate 17, these graduations being laid off so as to indicate in gallons, or other suitable terms of measurement the amount of fluid in the tank 12.

The spiral 15 is suspended entirely from a single top bearing and has no bearing at its lower end, the ribbon of which the spiral is made being simply turned over at right angles to its length, as indicated at 18, Fig. 6, after the float 14 has been threaded onto it to prevent the float dropping off when the parts are disassembled, although the gage would function equally well if the spiral were not provided with this overturned end, but were simply suspended from its top bearing as will be hereinafter described. The advantages of this suspension of the spiral 15 from its upper end leaving its lower end free and unattached, are that not only am I enabled to dispense with the necessity of forming a bearing at the lower end of the barrel, but also, and what is of more importance, is that there will be no binding of the float and spiral, if it should so happen that the spiral was slightly bent or distorted, for its lower end being free to move the float will travel up the spiral without any jamming, even though the spiral be bent, and therefore the necessity for absolute trueness of the spiral longitudinally is avoided.

Instead of guiding the float within the gage 10 by means of the air tube 13, I may utilize the construction shown in Figs. 5, 6 and 7 in which the tube of which the barrel or body portion of the gage is formed is indented, as at 19, to provide inwardly projecting ribs, which ribs will be engaged by corresponding seats in the sides of the float, as shown in Fig. 7; whereby the movement of the float will be confined to a vertical rise and fall and no rotation of the float can take place. While I have shown two indented ribs in Figs. 5 and 7, it will be obvious that one rib, as shown in Fig. 6, may be provided, although for the purpose of securing the dial in place, as will be hereinafter pointed out, the two rib construction is regarded as preferable. In the form of my invention shown in Figs. 12, 13 and 14, a further modification of this float guiding means is shown, and the tube in this case being slotted as at 20 to receive the fingers or projections 21 on the float and confine the float to a rising and falling movement and insure driving the spiral. Again, as shown in Figs. 15 and 16, I may secure this vertical movement of the float while preventing the rotation thereof by making the barrel of the gage non-circular in cross section. In Fig. 15 I have shown it as of polygonal form in cross section, so that the float cannot rotate about its axis, but is confined to the rising and falling movement, while in Fig. 16 the barrel of the gage is elliptical in cross section, and the float is therefore confined against rotation, although free to rise and fall vertically.

As stated, the spiral 15 is suspended at the top so that the lower bearing may be entirely dispensed with, and this suspension is accomplished by providing a bearing block 22 having a reduced portion 23 which passes through the center of the dial 17. The said block 22 receives the reduced end 25 of the spiral, and this reduced end, as best shown in Figs. 8, 9 and 10, is split, as at 26, the two ends of the split portion 26 being reversely bent so as to suspend the spiral in place, and at the same time clamp the index hand 16 in place, as shown in Figs. 8 and 10. When thus assembled, the spiral 15 is hung from the dial 17 and the bearing block 22 rotates with the spiral, said block and pointer 16 being driven as the spiral 15 rotates under the influence of the float, the parts being light and sufficiently supported without undue friction by the hub of the index 16 which is of a diameter slightly larger than the diameter of the opening in the barrel 17, and which rests upon the vitreous face of the dial 17. The necessity, therefore, for complicated supporting bearings for the suspended parts is done away with.

The dial 17 may be of any desired type, but it will preferably be a vitreous face top with suitable graduations therein, and a convenient means of mounting and securing this dial is shown in Figs. 5 and 8, in which form the dial is provided at its periphery with indentations 17ª which may be formed when the dial is struck, or stamped out of the stock from which it is made, these indentations being so formed as to seat, as best shown in Fig. 5, in the upper ends of the indented ribs 19 of the barrel, so that the dial will be securely held against rotation relative to the barrel.

The dial 17 may, if desired, be conveniently mounted in the manner shown in Fig. 11, in which the barrel 10 has its upper end spun inwardly as at 27 to provide an inturned flange on which the dial 17 may be conveniently secured by means of pins 28 carried by the dial and dropping into holes in the inturned flange 27, said dial 17 being firmly clamped in place by means of the glazed cap plate 29 threaded to the tube 10, as shown in Figs. 2, 11 and 13, by an interposed spacing ring, being preferably placed between the glass cover and the dial 17 to form an index or pointer containing chamber, as shown in Fig. 11.

It will be observed that in the form of my invention shown in Figs. 1 to 7, inclusive, and Figs. 15 and 16, the tube of the gage is entirely closed, and itself forms the receptacle for the liquid, thus dispensing with the necessity of providing a gage inclosing the casing, and in these forms the cap plate 29 simply serves as a glazed closure for the top of the gage. In the form shown in Figs. 12 and 13, however, the gage is designed to be dropped into a receiving casing or tank, the open slot and bottom of the gage body permitting the contained liquid in the casing or tank to act upon the float, and in this construction the cap plate of the gage body will be exteriorly threaded as at 30 to permit it to be seated in a suitable receiving aperture in the top of the casing or tank in which it is mounted.

While tank gages of the same general type have long been known, the construction which I have devised reduces the number of necessary parts and simplifies the construction and assembling of these parts, dispensing with bearings and float guides heretofore deemed necessary, and minimizing the number of parts, while at the same time preserving the efficiency of the device.

What I claim is:—

1. In a gage, the combination with a float barrel, of a non-rotatable float member in said barrel, an index actuating means suspended within said barrel in driving engagement with said float and having its lower end free and unattached to the barrel.

2. In a gage, the combination with a float barrel, of a non-rotatable float member in said barrel, and an index-actuating spiral suspended within said barrel in driving engagement with said float and having the lower end free and unattached.

3. In a gage, the combination with a float barrel, of a non-rotatable float in said barrel, a float driven spiral having a free unattached lower end, an index plate at the top of said barrel, and a spiral suspension bearing carried by said index plate.

4. In a gage, the combination with a float barrel having a dial-supporting ledge at its upper end, of a dial mounted on said ledge, a spiral mounted in a suspension bearing carried by said dial and having its lower end free and unattached, and a non-rotatable float in said barrel engaging said spiral.

5. In a gage, the combination with a float barrel having a ledge at its upper end, a dial mounted on said ledge, a rotatable bearing block mounted centrally of said dial, a spiral suspended from said bearing block and having a free unattached lower end, and a non-rotatable float in said barrel engaging said spiral.

6. In a gage, the combination with a float barrel having an integral spun-in ledge at its upper end, a dial mounted on said ledge, a rotatable bearing block mounted centrally of said dial, a spiral suspended from said bearing block, and a non-rotatable float in said barrel engaging said spiral.

7. In a float gage, the combination with a float barrel having a dial at its upper end, a bearing block rotatable in said dial a spiral having a reduced and split upper end engaging said bearing block, an index finger clamped to said bearing block by the spread ends of said split spiral, and a non-rotatable float in said barrel engaging said spiral.

8. In a float gage, the combination with a float barrel having a dial fixed at its upper end, a centrally placed bearing block rotatably mounted in said fixed dial, a spiral having its upper end engaged with said bearing block to rotate therewith, an index finger carried by said block and spiral, and means for fastening said block, spiral, and index finger together.

9. In a gage, a float barrel comprising a liquid tight tube having an inwardly projecting longitudinally placed rib rolled in its wall, a glazed cap plate closing one end of said barrel, a bottom plate adapted to connect with the supply pipe closing the other end of said barrel, a float in said barrel having a recess to engage said longitudinal rib, an index plate beneath said glazed cap plate, and a float engaging spiral suspended from said index plate.

10. In a gage, a float barrel having an inwardly projecting rib, a dial mounted at the top of said barrel, and interlocking means between said dial and said inwardly projecting rib to maintain the parts in a predetermined position.

11. In a gage, a float barrel having an indented rib, a dial mounted at the top of said barrel having an interlocking projection at the periphery thereof to engage said indented rib, and maintain the barrel and dial in predetermined relation.

12. In a gage, a float barrel having a rib rolled in the body thereof, a float in said barrel engaging the rib and guided thereby, a dial mounted on the top of said barrel and having a projection thereon adapted to engage said rib and maintain said dial and barrel in predetermined relation.

In testimony whereof I have hereunto set my hand in presence of two subscribing witnesses.

BERNARD H. CAMDEN.

Witnesses:
 A. V. CUSHMAN,
 GERTRUDE M. STUCKER.